United States Patent [19]
Seif et al.

[11] Patent Number: 5,479,360
[45] Date of Patent: Dec. 26, 1995

[54] TARGET PASSIVE RANGING WITHOUT AN OWNSHIP MANEUVER

[75] Inventors: Joel F. Seif, New Hartford; Christopher G. Nunno, Utica, both of N.Y.

[73] Assignee: Martin Marietta Corporation, Syracuse, N.Y.

[21] Appl. No.: 994,539

[22] Filed: Dec. 21, 1992

[51] Int. Cl.$^6$ ........................................................ G01S 7/00
[52] U.S. Cl. ............................ 364/516; 356/20; 342/161; 342/162; 342/95
[58] Field of Search ..................................... 364/516, 517, 364/458, 724.01, 151; 356/20; 342/161, 162, 95, 96, 101, 195

[56] References Cited

U.S. PATENT DOCUMENTS

| 4,320,287 | 3/1982 | Rawicz | 364/516 |
| 4,855,932 | 8/1989 | Cangiani et al. | 364/516 |
| 5,051,751 | 9/1991 | Gray | 364/516 |

Primary Examiner—Ellis B. Ramirez
Assistant Examiner—Thomas Peeso
Attorney, Agent, or Firm—Paul Checkovich; Stephen A. Young

[57] ABSTRACT

A method for estimating target parameters of a target with respect to a platform such as ownship includes assigning predetermined initial values for the target parameters, wherein the target parameters are part of models having respective model probabilities. The models may include a Kalman filter. The models are updated in response to measured parameters of the target, wherein the measured parameters are different from the ones to be estimated. After a predetermined number of updates, the model having the highest updated model probability may be selected as the winning model. The updated values of the target parameters in the winning model at the time of winner selection are used as the estimated values for the parameters sought to be estimated. The updated parameter values may be refined by restarting the process using the updated values of the winning model as the basis for assigning new initial values for the target parameters. The parameters to be estimated may include range and velocity of the target and the measured parameter may include azimuth and elevation. The method may be practiced without resort to ownship maneuvering.

20 Claims, 4 Drawing Sheets

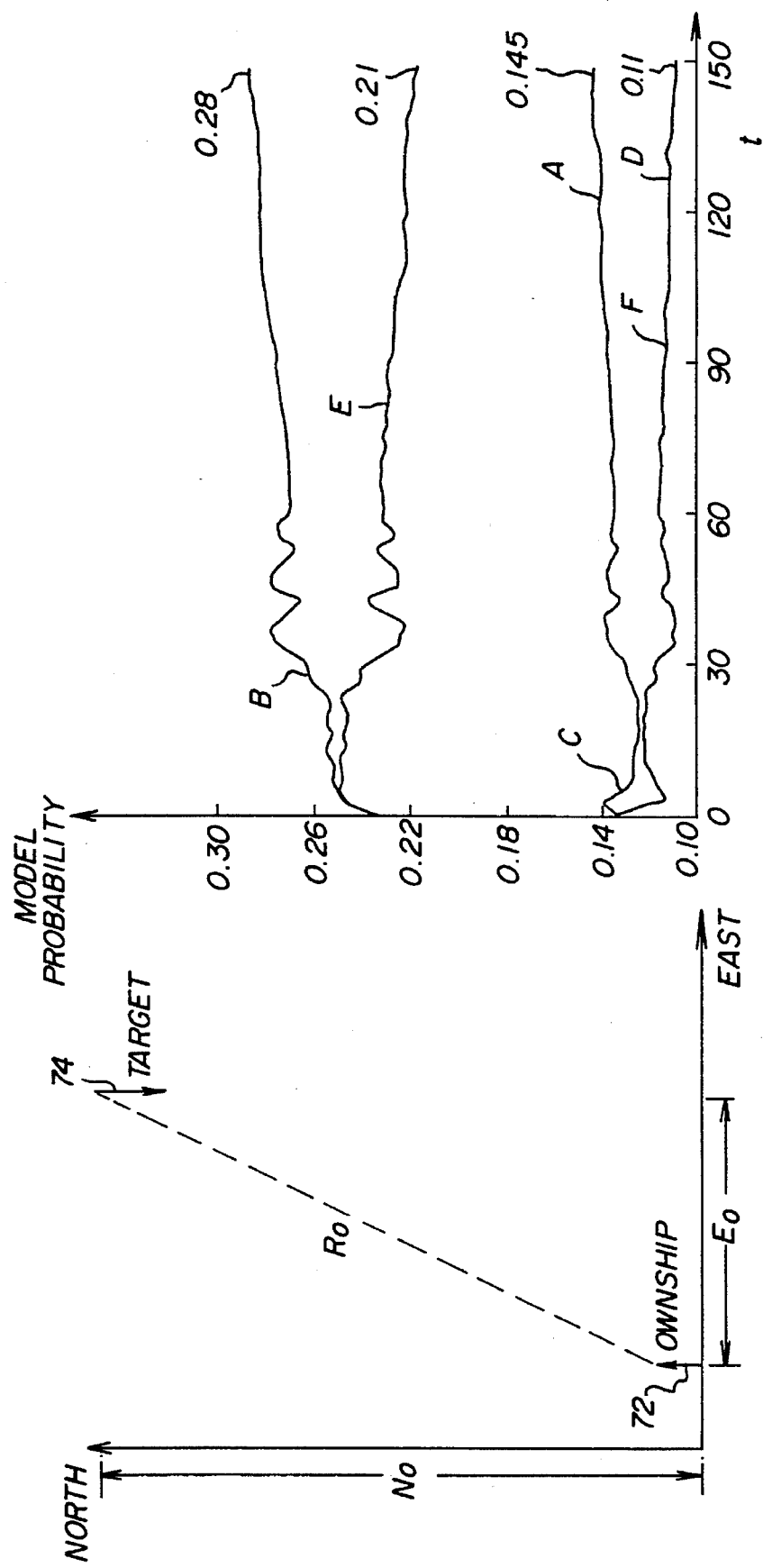

TARGET PASSIVE RANGING WITHOUT AN OWNSHIP MANEUVER

BACKGROUND OF THE INVENTION

This invention relates to target passive ranging and, more particularly, to determining passively the range from ownship to a target from estimates of predetermined initial target conditions or parameters without need to make a maneuver by ownship. The range determination is based on actual measurements of predetermined parameters of the target, other than range to target.

An estimate of range to, and/or velocity of, an object or target, especially from an airborne ownship in a potentially hostile environment, may be desired. Further, although active ranging, such as by use of a radar system that transmits electromagnetic energy and then receives a portion of the energy that is reflected from a target for generating such parameters of the target may be available, it may be desirable to determine target parameters passively, such as by use of an infrared (IR) signature of the target, so that ownship presence and location are not unduly and unnecessarily compromised.

A presently employed ranging technique computes range to an airborne target from a second airborne craft, or ownship, by performing ownship maneuvers in such a way as to obtain angular information (elevation and azimuth with respect to ownship) for "triangulating" on the target to estimate range to target. A single Kalman filter is generally used in the triangulation approach. Problems associated with this approach are that ownship is required to make maneuvers and that the resulting accuracy is a direct function of these ownship maneuvers for a given angle measurement accuracy and true range to the target. Further, such maneuvering may take about one minute, or at least tens of seconds for fighter-like aircraft, in order to achieve the desired accuracy, and maneuvering significantly increases the probability of detection by a hostile target having detection capabilities.

It would be desirable to provide a system capable of producing estimates of range to a target from ownship within a predetermined accuracy, without having to make any ownship maneuvers. That is, to obtain such estimates while ownship maintains a constant course, or heading, and velocity. For purposes herein, ownship maneuvers may be considered to be events, such as turning, accelerating, decelerating, changing altitude, etc., which deviate from a constant heading, altitude and velocity.

SUMMARY OF THE INVENTION

In accordance with the present invention, a method for estimating a first predetermined parameter of an object with respect to a reference comprises assigning one of a plurality of predetermined potential values for the first parameter to a corresponding plurality of models representative of the object, each model having a respective model probability, updating the plurality of models in response to a measured value of a second predetermined parameter of the object to form a corresponding plurality of updated models, selecting one of the updated models in response to an updated corresponding model probability and choosing the updated value of the potential value of the selected model as an estimate of the first predetermined parameter.

The corresponding model probability and updated model probability may be determined by a Kalman, or extended Kalman, filter in response to assigned potential values of the first parameter and measured values of the second parameter. The updated model having the highest corresponding updated model probability may be selected so that its associated updated first parameter also represents the highest probability from among all updated first parameters that it is the correct or winning value for the object. The object may be airborne such as a plane, jet, cruise missile, etc. and the reference may be ownship such as another airborne platform.

The step of updating may be repeated a predetermined number of times and the steps of selecting and choosing may then be performed after such repetition. The first parameter may be range from the reference to the object or velocity of the object and the second parameter may be angular position of the object with respect to the reference. The angular position may include azimuth and elevation. At least some of the potential values for the plurality of potential values may be different from each other.

In another aspect of the present invention, a method for estimating a set of parameters of an object with respect to a reference comprises assigning one of a corresponding respective plurality of predetermined potential values for each member of the set to a corresponding plurality of models representative of the object with each model having a respective model probability, updating the plurality of models in response to a measured value of a second predetermined parameter of the object to form a corresponding plurality of updated models, selecting one of the updated models in response to an updated corresponding model probability and choosing updated values of the potential values of the set corresponding to the selected one of the updated models as an estimate of the set of parameters of the object.

The set of parameters may include range and velocity and the second parameter may include angular position of the object with respect to the reference. The steps of updating may be repeated for a predetermined number of times after which the steps of selecting and choosing may be performed.

The set of object parameters may include range and velocity of the object and the second parameter may include angular position of the object with respect to the reference. The selected or winning updated model may be the one having the highest updated model probability.

The corresponding model probability and updated model probability for each set may be determined in response to an output from a respective Kalman, or extended Kalman, filter. The output of the Kalman filter may be determined in response to the assigned potential values for the parameters of the set and to the measured value of the second parameter.

In yet another aspect of the present invention, a method for estimating a value of a first predetermined number of first parameters of an object with respect to a reference comprises assigning a potential value for each first parameter to a second predetermined number of models representative of the object, updating the models in response to measured values of a third predetermined number of second parameters of the object to form updated models, selecting one of the updated models in response to a corresponding updated model probability and choosing the updated values of the first parameters of the selected updated model as an estimate of the corresponding values of the first parameters of the object with respect to the reference. The models include the first parameters and each model has a respective model probability.

The step of updating may be repeated a predetermined number of times and the steps of selecting and choosing may be performed after repetition for the predetermined number of times.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

BRIEF DESCRIPTION OF THE DRAWINGS

FIG. 4 is a schematic representation of a scenario which may be analyzed with the present invention.

FIG. 5 is a graphical representation of the scenario of FIG. 4 based on values assigned from Tables 1, 2 and 3 in accordance with the present invention.

DETAILED DESCRIPTION

Figure 1:
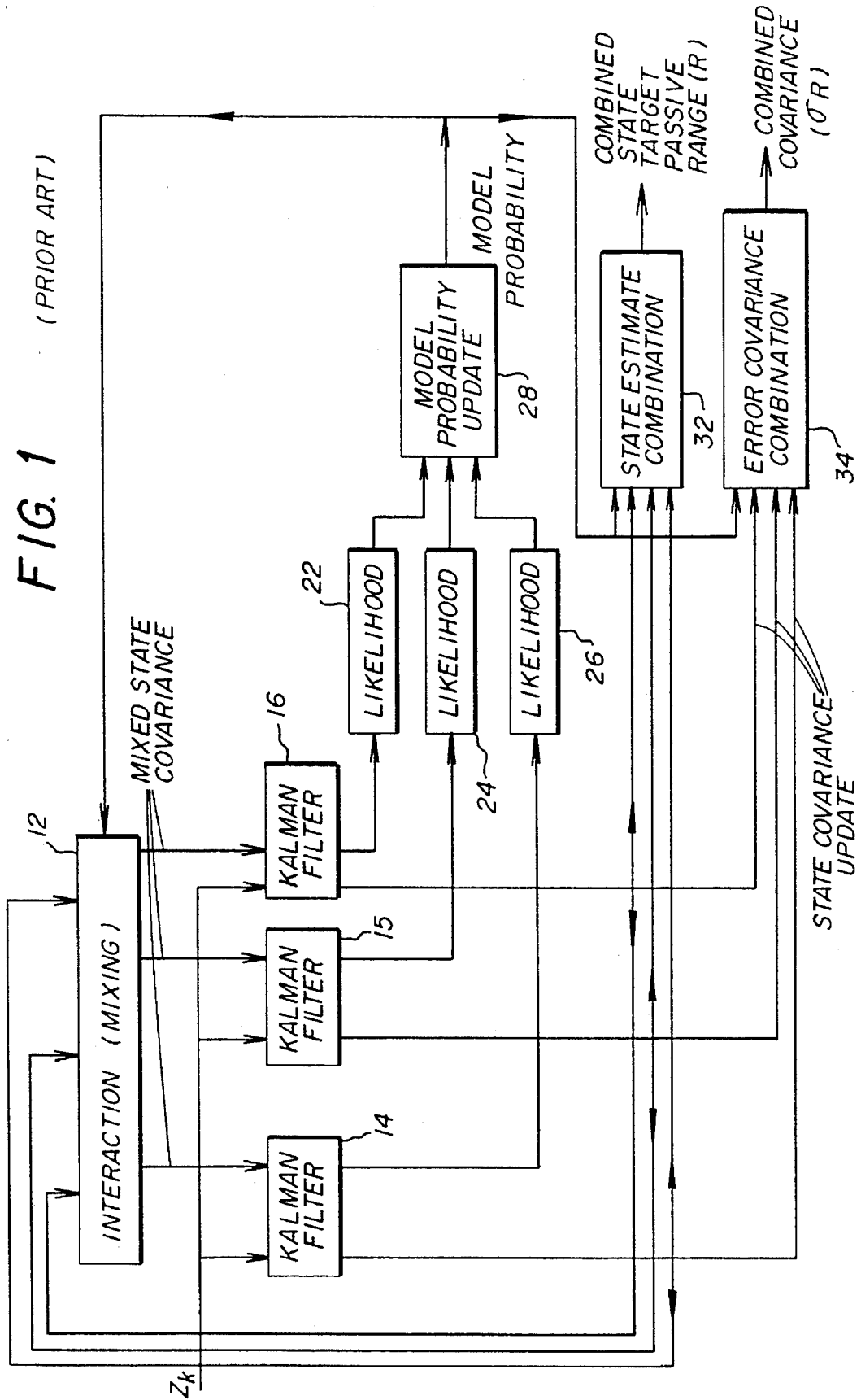
FIG. 1 is a block diagram of a prior passive track ranging system.

Referring to FIG. 1, a block diagram of a presently employed ranging technique is shown.

The system of FIG. 1 is based on an Interacting Multiple Model (IMM) architecture, which is explained in detail in Tracking and Data Association, by Bar-Shalom et al, *Academic Press, Inc.* (1988) and in "Multitarget-Multisensor Tracking" Vol. 1, Bar-Shalom (1987).

The IMM uses one or more Kalman filters or extended Kalman filters whose operation is well known to one of ordinary skill in the art, such as is described in the above-identified IMM references and in U.S. Pat. No. 5,058,836 which is assigned to the same assignee as hereof. Only so much of the details of the IMM as is necessary to an understanding of the present invention will be provided. Reference to the above-noted sources is directed for additional details.

he IMM approach was originally designed with the intent of providing robust tracking performance for a plurality of target flyout possibilities, such as benign constant velocity, constant heading and high "g" maneuvers. Use of multiple models or Kalman filters in parallel provides a scheme for the ownship platform to "tune" or predeterminedly configure each Kalman filter to respond to a predetermined portion of potential target flyout so that during a mission there will be at least one filter which may be considered to be "correct" for the current actual target conditions and performance.

For example, if three Kalman filters are used in an IMM configuration, they may be respectively assigned predetermined potential states for determining position, velocity and acceleration of a target. Thus, once track has been established on a target, the system should be able to maintain track inasmuch as any maneuvers by the target should be detected by at least one of the filters. Filter outputs would be supplied to update the tracker.

The system of FIG. 1 includes three Kalman filters 14, 15 and 16 which each receive predetermined actual measurement values $Z_k$, such as angular azimuth and elevation. For tracking, each of filters 14, 15 and 16 is initialized, or seeded, with the same value of the parameter to be determined, such as range.

The output of state estimate combination circuitry 32 has available a combined state target passive range (R) signal available thereat, while the error covariance combination circuitry 34 has a combined covariance ($\sigma_R$) signal available thereat. It is noted that although the term circuitry is used, the functions represented by each box of FIG. 1 (as well as those of FIG. 2 to be described below) may be performed by an appropriately programmed general purpose computer as is known in the art.

Range (R) and covariance ($\sigma_R$) are designated as combined functions. That is, the value of range (R) from circuitry 32 includes a predetermined contribution from the range function of each filter 14, 15 and 16, while the value of covariance ($\sigma_R$) from circuitry 34 includes a predetermined contribution from the covariance function of each filter 14, 15 and 16. In this IMM implementation, the values of range (R) and covariance of range ($\sigma_R$) are a function of the range and covariance, respectively, of all Kalman filters of the system that provide range and covariance information to circuitry 32 and 34, respectively.

Figure 2:
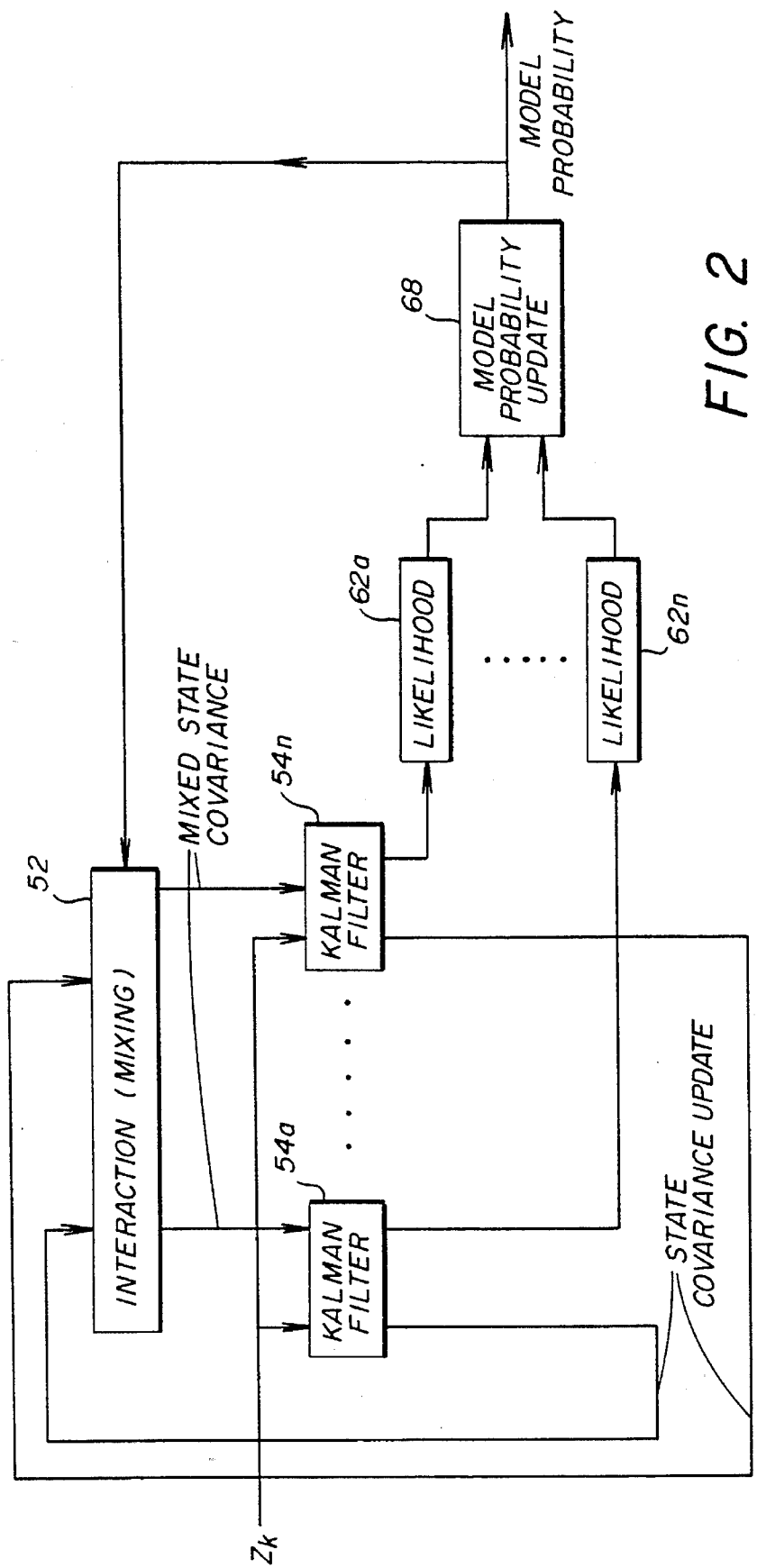
FIG. 2 is a block diagram of a passive ranging system in accordance with the present invention.

Referring to FIG. 2, a block diagram of a passive ranging system in accordance with the present invention is shown.

The passive ranging system includes a plurality of Kalman, or extended Kalman, filters 54a through 54n, a corresponding plurality of likelihood circuitry 62a through 62n, model probability update circuitry 68, having a respective input connected to an output of respective likelihood circuitry 62 and interaction or mixing circuitry 52. Each Kalman filter 54 receives a signal $Z_k$ representative of an actual measurement of a target parameter or set of parameters and provides state and covariance update signals to interaction circuitry 52. For one application of the system of FIG. 2, only the angular relationship, or azimuth and elevation, between a target and ownship, which may be considered the reference, is received.

The components shown in FIG. 2 may be identical in composition and function to like components shown in FIG. 1. It is noted that combination circuitry 32 and 34 (FIG. 1) are neither used nor required in the configuration of FIG. 2. Thus, corresponding computer processing and other elements represented by circuitry 32 and 34 are neither used nor required for practicing the present invention.

Each filter 54a–54n is initialized or seeded with a different combination of values for a set of predetermined potential target values. For example, potential target range and velocity may be seeded for each filter 54a–54n. This portion of the invention is discussed in more detail in conjunction with FIGS. 4 and 5 below.

In explaining the present invention, it will be assumed throughout this discussion that it is desired to determine an estimate of the range R and velocity V of a target, with the only actual target information $Z_k$ available being angular, such as may be obtained from a passive IR system, relating to azimuth and elevation of the target with respect to ownship. Further, it is assumed that ownship does not maneuver so that it maintains a constant heading, constant altitude flight path, although maneuvering by ownship does not affect the validity or practice of the present invention. That is, the current invention is not limited solely to situations where ownship does not maneuver.

Available at the output of circuitry 68 is a model probability signal for each model whose value indicates the probability that the current state of the model represented by a corresponding filter 54a–54n signifies the actual condition of the target. Although represented by a single line, it is to be understood that the model probability for a filter 54a–54n may be provided from one of a plurality of outputs from circuitry 68, or may be synchronized such that the probability signal associated with a corresponding filter may be properly associated therewith.

Figure 3:
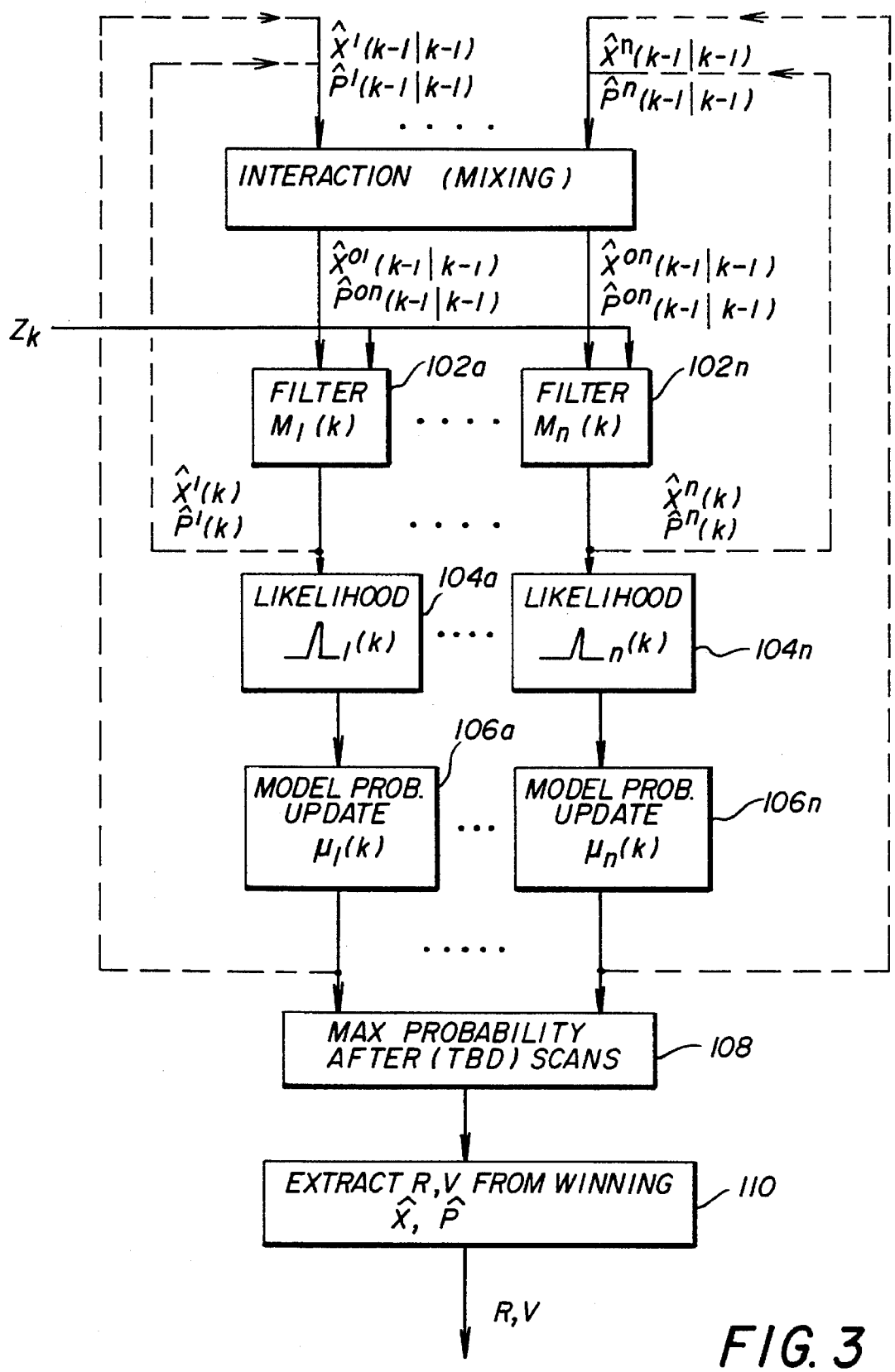
FIG. 3 is a flow diagram of the passive ranging system of FIG. 2.

Referring to FIG. 3, a flow diagram of the passive ranging system of FIG. 2 is shown.

For purposes of this discussion, solid lines in FIG. 3 between functions or steps represent and provide a single scan or iteration flow path whereas broken lines represent and provide information flow from a scan or iteration i to a next scan or iteration i+1, wherein i is an index for identifying a predetermined scan. Further, the functions of steps of the flow diagram of FIG. 3 may be programmed for execution by a general purpose computer as is known in the art.

Execution of step 100 computes or calculates values for the extrapolated measurement updated state vectors $\hat{X}^{o1}$(K–1|K–1) through $\hat{X}^{on}$(K–1|K–1) and the extrapolated measurement updated error covariance vectors $\hat{P}^{o1}$(K–1|K–1) through $\hat{P}^{on}$(K–1|K–1) in accordance with equations (1) and (3) below, respectively. The second superscript n or t of $\hat{X}$ and $\hat{P}$ identifies the particular model to which the corresponding value of $\hat{X}$ and $\hat{P}$ is assigned. The highest value of t will be r, the total number of models or Kalman filters 54a–54n (FIG. 2) in the system. The notation (K–1|K–1) refers to the state of the associated variable at time K–1 given that information relating to the variable is known and used at time K–1. For the first pass through the flow diagram of FIG. 3, time (K–1) represents the initiation time whereas time K represents the later current time. For succeeding passes, time (K–1) represents the immediately preceding or last time at which the steps were executed and time K represents the current time of execution of the steps in the cycle.

$$X^{ot}(K-1/K-1) = \sum_{s=1}^{r} X^{s}(K-1/K-1)\mu_{s/t}(K-1/K-1), \quad (1)$$

for t = 1, r models, wherein $$\mu_{s/t}(K-1/K-1) = \frac{Pst\mu_s(K-1)}{\sum_{s=1}^{r}[Pst\mu_s(K-1)]} \quad (2)$$

The variable $\mu_s$(k–1) represents the individual model probability at time K–1, which may be initially set to be equal to (1/r) so that all model probabilities are initially equally likely to be the "winning" or "correct" one. Of course, all model probabilities need not be initially equal, and appropriate weighting factors may be applied to determine the initial probability to be assigned to a model based on the designer's or operator's determination that such a model is more or less likely to be the correct one. The only constraint is that the sum of all model probabilities at any predetermined time, including initialization must equal one.

The function $p_{st}$ is an assumed Markov model transition or switching probability function whose value provides the probability of jumping or changing from model at time K–1 to model t at time K. The values of the model transition probabilities are determined as part of the overall system design, analogously to the choice of values for the initial values of the predetermined model parameters.

For determining $p^{ot}$ the following equation may be used:

$$P^{ot}(K-1 \ K-1) = \quad (3)$$

$$\sum_{s=1}^{r} \mu_{s/t}(K-1/K-1)\{P^s(K-1/K-1) +$$

$$[\hat{X}^s(K-1/K-1) - \hat{X}^{ot}(K-1/K-1)] \times$$

$$[\hat{X}^s(K-1/K-1) - \hat{X}^{ot}(K-1/K-1)]^T\},$$

wherein superscripted T indicates the transpose of a matrix.

After completing step 100, the values of $X^{o1}$(K–1|K–1) through $X^{on}$(K–1|K–1) and $P^{o1}$(K–1|K–1) through $P^{on}$(K–1|K–1) are supplied as corresponding inputs for steps 102a through 102n, respectively. Each of steps 102a–102n also receives measurement values $Z_k$ that may be represented by a column matrix or vector and which for one embodiment of the present invention includes target azimuth and target elevation with respect to ownship.

Execution of step 102a–102n performs five (5) conventional Kalman filter computations which may be represented as:

$$\tilde{X} = \Phi \hat{X} + ownship, \quad (a)$$

$$\tilde{P} = \Phi \hat{P} \Phi^T + Q, \quad (b)$$

$$K = \tilde{P}H^T(H\tilde{P}H^T+R), \quad (c)$$

$$\hat{P} = [I-KH]\tilde{P}, \quad (d)$$

and $$\hat{X} = \tilde{X} + K[Z-f(\tilde{X})], \quad (e)$$

wherein $\tilde{X}, \hat{X}$ = extrapolated, time updated and measurement updated state vector (nx1), $\tilde{P}, \hat{P}$ = extrapolated, time updated and measurement updated state vector (nxn), $\Phi$ = state transition matrix (nxn), OWNSHIP = ownship correction vector (nx1), Q = process noise covariance matrix (mxn), H = measurement transformation matrix (mxn), R = measurement error covariance matrix (mxm), I = identity matrix (nxn), K = Kalman gain matrix (nxm), $\vec{Z}$ = measurement vector (mx1), $f(\tilde{X})$ = functional—predicted measurement vector (mx1), $Z-f(\tilde{X}) = Z-H\tilde{X}$ = measurement residual vector, $(H\tilde{P}H^T+R) = S$ = measurement residual covariance matrix (mxm, n = number of state variables, m = number of measurements, and superscripted (–1) indicates the inverse of the matrix. For the example being carried throughout this discussion, the value of m is 2 (azimuth and elevation).

The variables in parentheses at the end of the definitions above represent the size of the matrix in the form of (uxv), wherein u is the number of rows and v is the number of columns. It is noted that for all functions designated as a vector, the number of columns is one.

In short, equations (a)–(e) may be referred to as the state extrapolation, error covariance extrapolation, Kalman gain calculation, error covariance update and state update equation, respectively.

After completion of steps 102a–102n the program proceeds to execute steps 104a through 104n with each step 104 receiving appropriate inputs (signal values) from correspondingly subscripted step 102 for determining the likelihood function $\Lambda(K)$.

Each step 104 performs the following calculation:

$$\Lambda(K) = \frac{\exp[-(Z_k - Z_k^t)^T (S_k^t)^{-1}(Z_k - Z_k)(1/2]}{(2\pi)^{m/2}|S_k^t|^{1/2}} \quad (4)$$

wherein $Z_k$ represents the actual measured values of predetermined parameters (incoming measurement vector), $Z_k^t$ represents the Kalman filter (Step 102) estimate of the predetermined parameters (estimated measurement vector), $S = (HPH^T + R)$ as noted above (measurement residual covariance matrix), and $|S|$ represents the determinant of matrix S.

Upon completion of steps 104a–104n the program proceeds to execute steps 106a through 106n with each step 106 receiving an appropriate input signal value for likelihood $\Lambda(K)$ whose subscript corresponds to that of step 106 for updating model probabilities.

Each step 106 performs the following computation:

$$\mu_t(K) = \frac{\Lambda_t(K) \sum_{s=1}^{r} Pst\mu_s(K-1)}{\sum_{t=1}^{r} \left[ \Lambda(K) \sum_{s=1}^{r} Pst\mu_s(K-1) \right]} \quad (5)$$

wherein the value of $\mu_t(k)$ is the probability that model t is the correct or winning model at time X.

Each probability value $\mu_t(K)$ for corresponding models is supplied as an input for operation of step 108. Performance of step 108 selects the highest probability after a predetermined, or to be designated (TBD), number of scans or passes through steps 100, 102, 104 and 106.

That is, execution of the cycle of steps 100, 102, 104 and 106 may be repeated in the order recited a predetermined number of times or until a predetermined time from the initial performance of step 100, or the entire cycle, has expired or been exceeded during execution. The model or filter 54a–54n (FIG. 2) corresponding to the highest probability is determined the correct or winning model. Execution of step 110 extracts or selects the values of predetermined parameters of the winning model from the $\hat{X}$ and $\hat{P}$ functions that exist at the time K that the winning model is determined by performance of step 108.

In other words, values of predetermined parameters of one model are selected by performance of step 110. This differs from the system of FIG. 1, wherein the parameter range R obtained from circuitry 32 was a composite of the corresponding parameters from all models or filters. Another difference noted between the systems of FIG. 1 and FIG. 2 is that for the system of FIG. 1, a parameter like range, which is desired to be estimated, is seeded with the same value for all filters 32, whereas in accordance with the present invention, different seeding values for the same parameter may be used in different filters 54.

For the example that has been used herein, the values of range R and velocity V may be obtained from step 100 once a winning model is determined by performance of step 108. The values of range R and velocity V of the winning model may be provided from step 110 to additional circuitry or systems, such as fire control, for processing as is known in the art.

In addition, the values of range R and velocity V from the winning model may be used to refine the estimation of the same parameters. For example, if range values of 25, 50, 75 and 100 km were initially seeded in respective filters 54 and the winning model was determined to be the third model having a range value R of 60 km at time of winner selection, then the process of FIG. 3 may be restarted with new range seeding values chosen to be, for example, 40, 50, 60 and 70 km respectively, a difference of only 10 km between the next closest range seeding, whereas the original scheme used 25 km between the next closest range seeding. A similar refinement may be practiced with the values of velocity seeding based on the winning model, as well as for any other parameters that are desired to be determined and have been initially seeded.

Referring to FIG. 4, a schematic representation of a scenario which may be analyzed with the present invention is shown.

The scenario of FIG. 4 represents a mid-range flyby. The actual value of the significant parameters are:

$N_o$=100 km $E_o$=37 km $R_o$=106.6 km (57.57 nm)

$V_{ownship} = V_{target}$=250 m/sec (Mach 0.8)

T(update time)=1 sec.

Six filters 54a–54f were assigned which each receiving only angle measurements (azimuth, elevation). The assumed range R and velocity V values used are shown in Table 1. The filter seeding is shown in Table 2.

TABLE 1

R1=46.3 KM (25 nm)

R2=92.6 Km (50 mm)

R3=138.9 Km (75 nm)

VT1=240 m/sec

VT2=380 m/sec wherein R represents range to target and VT represents velocity of target.

TABLE 2

| Filter | Range, Velocity Seed |
|--------|----------------------|
| 54a    | R1, VT1              |
| 54b    | R2, VT1              |
| 54c    | R3, VT1              |
| 54d    | R1, VT2              |
| 54e    | R2, VT2              |
| 54f    | R3, VT2              |

Table 3 represents the switching probability ($p_{st}$) matrix

TABLE 3

| 0.70 | 0.30 | 0.00 | 0.00 | 0.00 | 0.00 |
|------|------|------|------|------|------|
| 0.15 | 0.70 | 0.15 | 0.00 | 0.00 | 0.00 |
| 0.00 | 0.30 | 0.70 | 0.00 | 0.00 | 0.00 |
| 0.00 | 0.00 | 0.00 | 0.70 | 0.30 | 0.00 |
| 0.00 | 0.00 | 0.00 | 0.15 | 0.70 | 0.15 |
| 0.00 | 0.00 | 0.00 | 0.00 | 0.30 | 0.70 |

Referring to FIG. 5, a graphical representation of the scenario of FIG. 4 based on values assigned from Tables 1, 2 and 3 in accordance with the present invention is shown.

The curves of FIG. 5 are labelled A through F, which correspond to models or filters 54a–54f, respectively.

It is noted that within a very short time, say less than 10 seconds, models A, C, D and F have been effectively eliminated as indicated by a precipitous drop in their corresponding model probabilities. (Remember that all models are generally initially seeded with the same model probability in order not to prejudice or bias any particular model). Within that same time frame models B and E still appear to be in contention. After 30 seconds it appears that model B has the highest probability and by 45 seconds it is clear that model B is the winner.

The time at which a winning model is chosen will depend upon competing criteria. Generally, the longer the time interval over which the models are updated, the more accurate (less actual error) the estimated value of the parameters will be. However, in a hostile environment, it is typically desirable to act as quickly as possible, which generally permits the estimated target parameter value to be within a certain error window with respect to the actual target parameter value. In addition, an early decision may be desirable after a relatively short time, say after 5 or 10 seconds for the scenario of FIG. 4, wherein models A, C, D and F may be quickly eliminated from further consideration, for freeing their filters and associated circuitry for more relevant processing based on appropriate seeding values as determined from observation of models B and E. That is, the values of the pertinent target parameters from model B (the winner) may be used to determine reseeding and refinement of the same parameters for models of filters 54a, 54c, 54d and 54f, so that the reseeded values more nearly approximate those of filter 54b at the time of winner determination.

The number of filters 54, and therefore number of models available for processing, that may be used, and the update rate, or time to perform steps 100–106 in accordance with the present invention may be limited by computing and computational capabilities of ownship equipment. Preferably, all outputs from step 100 are determined in parallel, as well as for steps 102, 104 and 106 which desirably are each respectively performed in parallel. Measurements $Z_k$ must be provided once each update cycle or scan. However, with current sampling and settling techniques, it will usually not be a problem seasonably to supply analog, or preferably digital, values for measured parameters to be available so that filter step 102 may be beneficially performed.

The overall scan or cycle iteration rate should be selected to be fast enough to detect and process rapid changes in target parameters without unduly overloading available computing capacity or sensor capability. Typically, target capabilities may be bounded by apriori knowledge of the type and character of targets to be expected so that computing resources may be directed to regions where practical target performance and operation is anticipated.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A method for estimating a first predetermined parameter of an object with respect to a reference, comprising:

assigning one of a plurality of predetermined potential values for the first parameter to a corresponding plurality of models representative of the object, each model having a respective model probability;

updating the assigned potential value for the first parameter and the corresponding model probability in response to a measured value of a second predetermined parameter of the object to form a corresponding plurality of updated models, having respective updated first parameter and model probability;

selecting one of the updated models in response to a corresponding updated model probability; and choosing the updated value of the first parameter for the selected updated model as an estimate of the first predetermined parameter.

2. The method as in claim 1, further including determining the corresponding model probability for each of the plurality of potential values in response to an output from a respective Kalman filter, wherein the output of the Kalman filter is further in response to one of the assigned potential values for the first predetermined parameter and the measured value of the second parameter, and further wherein the step of selecting includes selecting the one of the updated models having the highest corresponding updated model probability.

3. The method as in claim 1, wherein the first predetermined parameter is range from the reference to the object and the second predetermined parameter is angular position of the object with respect to the reference.

4. The method as in claim 3, wherein the angular position includes azimuth and elevation of the object with respect to the reference.

5. The method as in claim 1, wherein at least some of the potential values for the plurality of potential values are different from each other.

6. The method as in claim 1, wherein the first predetermined parameter is velocity.

7. The method as in claim 1, wherein the step of updating is repeated a predetermined number of times and the steps of selecting and choosing are performed after repetition for the predetermined number of times.

8. The method as in claim 1, wherein the value of the updated model probability is indicative of the likelihood that the model represents the actual relationship between the object and the reference and further wherein the step of selecting includes selecting the one of the updated models having the highest value of the corresponding updated model probability.

9. The method as in claim 1, wherein the model includes a Kalman filter.

10. A method for estimating a set of parameters of an object with respect to a reference, comprising:

assigning one of a corresponding respective plurality of predetermined potential values for each member of the set to a corresponding plurality of models representative of the object, each model having a respective model probability;

updating the assigned one of potential values for each member of the set for each corresponding model and the corresponding model probability in response to a measured value of a second predetermined parameter of the object to form a corresponding plurality of updated models, having respective updated first parameter and model probability;

selecting one of the updated models in response to a corresponding updated model probability; and choosing updated values of the set for the selected updated model as an estimate of the set of parameters of the object.

11. The method as in claim 10, wherein the set includes range and velocity and the second parameter includes angular position of the object with respect to the reference.

12. The method as in claim 10, further including determining the corresponding model probability for each set in response to an output from a respective Kalman filter, wherein the output of the Kalman filter is further in response to the assigned potential values for the set and the measured value of the second parameter, and further wherein the step of selecting includes selecting the one of the updated models having the highest updated model probability.

13. The method as in claim 12, wherein the set includes range and velocity and the second parameter includes angular position of the object with respect to the reference.

14. The method as in claim 10, wherein the step of updating is repeated a predetermined number of times and the steps of selecting and choosing are performed after repetition for the predetermined number of times.

15. The method as in claim 10, wherein the value of the updated model probability is indicative of the likelihood that the model represents the actual relationship between the object and the reference and further wherein the step of selecting includes selecting the one of the updated models having the highest value of the corresponding updated model probability.

16. The method as in claim 10 wherein the model includes a Kalman filter.

17. A method for estimating a value of a first predetermined number of first parameters of an object with respect to a reference, comprising:

assigning a potential value for each first parameter to a second predetermined number of models representative of the object, the models Including the first parameters and each model having a respective model probability;

updating the assigned potential value for the first parameter and the corresponding model probability In response to measured values of a third predetermined number of second parameters of the object to form updated models, having respective updated first parameter and model probability;

selecting one of the updated models in response to a corresponding updated model probability; and choosing the updated values of the first parameters of the selected updated model as an estimate of the corresponding values of the first parameters of the object with respect to the reference.

18. The method as in claim 17, wherein the step of updating is repeated a predetermined number of times and the steps of selecting and choosing are performed after repetition for the predetermined number of times.

19. The method as in claim 17, wherein the value of the updated model probability is indicative of the likelihood that the model represents the actual relationship between the object and the reference and further wherein the step of selecting includes selecting the one of the updated models having the highest value of the corresponding updated model probability.

20. The method as in claim 17, wherein the model includes a Kalman filter.

\* \* \* \* \*